United States Patent
Xie et al.

(10) Patent No.: US 10,281,988 B2
(45) Date of Patent: May 7, 2019

(54) METHOD FOR DISPLAY CONTROL AND ELECTRONIC DEVICE

(71) Applicants: Beijing Lenovo Software Ltd., Beijing (CN); Lenovo (Beijing) Limited, Beijing (CN)

(72) Inventors: Qingdi Xie, Beijing (CN); Xiaoping Zhang, Beijing (CN); Gang Li, Beijing (CN); Chunlong Yang, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 177 days.

(21) Appl. No.: 14/585,798

(22) Filed: Dec. 30, 2014

(65) Prior Publication Data
US 2016/0034093 A1 Feb. 4, 2016

(30) Foreign Application Priority Data

Jul. 30, 2014 (CN) .......................... 2014 1 0370257

(51) Int. Cl.
   *G06F 3/041* (2006.01)
   *G06F 3/01* (2006.01)
   *G06F 3/0488* (2013.01)

(52) U.S. Cl.
   CPC .............. *G06F 3/017* (2013.01); *G06F 3/041* (2013.01); *G06F 3/04883* (2013.01); *G06F 3/0412* (2013.01); *G06F 3/0416* (2013.01)

(58) Field of Classification Search
   CPC .. G06F 3/0416; G06F 3/0412; G06F 3/03488; G06F 2203/04104; G06F 3/041; G06F 3/017; G06F 3/04883

(Continued)

(56) References Cited

U.S. PATENT DOCUMENTS

| 5,612,719 A | 3/1997 | Beernink et al. |
| 2012/0242611 A1* | 9/2012 | Zhang ................. G06F 3/03547 345/173 |

(Continued)

FOREIGN PATENT DOCUMENTS

| CN | 101999112 A | 3/2011 |
| CN | 103425426 A | 12/2013 |

(Continued)

OTHER PUBLICATIONS

"Chinese Office Action Serial No. 201410370257, dated Nov. 16, 2017", w/English Translation, (dated Nov. 16, 2017), 17 pgs.

*Primary Examiner* — Jimmy H Nguyen (74) *Attorney, Agent, or Firm* — Schwegman Lundberg & Woessner, P.A.

(57) ABSTRACT

A method for display control and an electronic device are provided. The method includes: detecting a first touch operation and a second touch operation performed on a touch sensing unit. A first touch direction corresponding to the first touch operation and a second touch direction corresponding to the second touch operation are obtained. A first control instruction is obtained based on the first touch direction and the second touch direction. That is, in embodiments of the disclosure, the effect of a touch instruction response to two successively performed touch operations is different from the effect of a touch instruction response to two separately performed touch operations.

19 Claims, 3 Drawing Sheets

(58) Field of Classification Search
USPC .......................................... 345/173; 715/863
See application file for complete search history.

(56) References Cited

U.S. PATENT DOCUMENTS

| | | | | |
|---|---|---|---|---|
| 2013/0293503 | A1* | 11/2013 | Zhou .................. | G06F 3/04883 345/173 |
| 2015/0116237 | A1* | 4/2015 | Yu ...................... | G06K 9/00355 345/173 |
| 2016/0125913 | A1* | 5/2016 | Peng .................. | G06F 3/04883 386/343 |

FOREIGN PATENT DOCUMENTS

| | | |
|---|---|---|
| CN | 103645855 A | 3/2014 |
| CN | 103793163 A | 5/2014 |

* cited by examiner

METHOD FOR DISPLAY CONTROL AND ELECTRONIC DEVICE

PRIORITY APPLICATION

This application claims the benefit under 35 U.S.C. 119 to Chinese Application No. 201410370257.6, filed on 30 Jul. 2014; which application is incorporated herein by reference in its entirety.

TECHNICAL FIELD

The disclosure relates to the field of electronic technology, and particularly, to a method for display control and an electronic device.

BACKGROUND

Nowadays, mobile terminal devices are more and more widely used. Terminal devices, such as handsets, tablet computers, provide users with significant convenience, and various applications for mobile terminals are also developed accordingly. As a result, the development of mobile terminals, especially those capable of being operated through touch operations, is rapidly progressing in various aspects.

Currently, a variety of touch operations are required to control mobile terminals. Some applications for mobile terminals even require users to perform successive touch operations to achieve their desired effects. For example, in order to control display contents on mobile terminals, users may need to perform multiple tedious touch operations, thus not only resulting in complicated touch operations but also making it inconvenient for users to use the mobile terminals.

SUMMARY

Embodiments of the disclosure provide a method for display control and an electronic device.

According to one aspect of the present disclosure, a method for display control is provided, which includes:

detecting, on a touch sensing unit, a first touch operation and a second touch operation after the first touch operation;

analyzing the first touch operation and the second touch operation;

determining a first touch direction corresponding to the first touch operation and a second touch direction corresponding to the second touch operation;

obtaining a first control instruction based on the first touch direction and the second touch direction, wherein the first control instruction is different from instruction consisting of a second and a third control instructions, the second and the third control instructions respectively correspond to the first touch operation and the second touch operation.

Optionally, prior to detecting the second touch operation after the first touch operation, the method further comprises:

detecting the first touch operation on the touch sensing unit; and responding to the first touch operation.

Optionally, analyzing the first touch operation and the second touch operation comprises:

obtaining a first time interval between the first touch operation and the second touch operation;

analyzing the first touch operation and the second touch operation if the first time interval is less than or equal to a first preset threshold;

analyzing the first touch operation to obtain the second control instruction and analyzing the second touch operation to obtain the third control instruction if the first time interval is greater than the first preset threshold, wherein the second control instruction and the third control instruction are performed separately.

Optionally, determining the first touch direction and the second touch direction comprises:

determining a first touch track based on the first touch operation, and determining a second touch track based on the second touch operation;

obtaining a first touch start point and a first touch end point in the first touch track and a second touch start point and a second touch end point in the second touch track;

determining the first touch direction of the first touch operation relative to a first edge of the touch sensing unit based on the first touch start point and the first touch end point in the first touch track;

determining the second touch direction of the second touch operation relative to the first edge of the touch sensing unit based on the second touch start point and the second touch end point in the second touch track.

Optionally, obtaining the first control instruction based on the first touch direction and the second touch direction comprises:

determining a minimum angle formed between the first touch direction and the second touch direction;

obtaining the first control instruction corresponding to the minimum angle to control a display content on a display unit.

Optionally, obtaining the first control instruction based on the first touch direction and the second touch direction comprises:

determining a minimum angle formed between the first touch direction and the second touch direction;

determining whether the minimum angle is less than or equal to a second preset threshold;

obtaining the first control instruction to control a display content on a display unit, if the minimum angle is less than or equal to the second preset threshold.

Optionally, if an area of the display content is larger than an area of a display region of the display unit, the method further comprises moving the display content at a preset speed upon completion of the second touch operation, until a boundary of the display content enters the display region; or displaying the boundary of the display content at the display region upon completion of the second touch operation.

Optionally, the method further comprises:

detecting a third touch operation and a fourth touch operation after the third touch operation;

determining a third touch track corresponding to the third touch operation and a fourth touch track corresponding to the fourth touch operation, wherein the third touch track is different from the first touch track and the second touch track, and the fourth touch track is different from the first touch track and the second touch track;

obtaining a third touch direction corresponding to the third touch operation and a fourth touch direction corresponding to the fourth touch operation;

generating the first control instruction if the third touch direction is the same as the first touch direction and the fourth touch direction is the same as the second touch direction.

Optionally, obtaining the first control instruction based on the first touch direction and the second touch direction comprises:

determining a minimum angle formed between the first touch direction and the second touch direction;

determining whether the minimum angle is greater than or equal to a third preset threshold;

generating the first control instruction to zoom in or zoom out the display content on the display unit, if the minimum angle is greater than or equal to the third preset threshold.

Optionally, a time interval between a touch start time and a touch end time corresponding to each of the first touch operation and the second touch operation is less than or equal to a fourth preset threshold.

According to another aspect of the present disclosure, an electronic device is provided, which includes:

a detector adapted to detect on a touch sensing unit a first touch operation and a second touch operation after the first touch operation;

a processor coupled to the detector, and adapted to:

analyze the first touch operation and the second touch operation;

determine a first touch direction corresponding to the first touch operation and a second touch direction corresponding to the second touch operation; and obtain a first control instruction based on the first touch direction and the second touch direction, wherein the first control instruction is different from instruction consisting of a second control instruction corresponding to the first touch operation and a third control instruction corresponding to the second touch operation.

Optionally, the processor is further adapted to respond to the first touch operation.

Optionally, the processor is further adapted to:

obtain a first time interval between the first touch operation and the second touch operation;

analyze the first touch operation and the second touch operation if the first time interval is less than or equal to a first preset threshold;

analyze the first touch operation to obtain the second control instruction and analyze the second touch operation to obtain the third control instruction if the first time interval is greater than the first preset threshold, wherein the second control instruction and the third control instruction are performed separately.

Optionally, the processor is further adapted to:

determine a first touch track based on the first touch operation and a second touch track based on the second touch operation;

obtain a first touch start point and a first touch end point in the first touch track and a second touch start point and a second touch end point in the second touch track;

determine the first touch direction of the first touch operation relative to a first edge of the touch sensing unit based on the first touch start point and the first touch end point in the first touch track; and determine the second touch direction of the second touch operation relative to the first edge of the touch sensing unit based on the second touch start point and the second touch end point in the second touch track.

Optionally, the processor is further adapted to:

determine a minimum angle formed between the first touch direction and the second touch direction; and obtain the first control instruction corresponding to the minimum angle to control a display content on a display unit.

Optionally, the processor is further adapted to:

determine a minimum angle formed between the first touch direction and the second touch direction;

determine whether the minimum angle is less than or equal to a second preset threshold; and obtain the first control instruction to control a display content on a display unit if the minimum angle is less than or equal to the second preset threshold.

Optionally, if an area of the display content is larger than an area of a display region on the display unit, the processor is further adapted to control the display content in response to the first control instruction by:

moving the display content at a preset moving speed upon completion of the second touch operation, until a boundary of the display content enters the display region; or displaying the boundary of the display content at the display region upon completion of the second touch operation.

Optionally, the processor is further adapted to:

detect a third touch operation and a fourth touch operation after the third touch operation;

determine a third touch track corresponding to the third touch operation and a fourth touch track corresponding to the fourth touch operation, wherein the third touch track is different from the first touch track and the second touch track and the fourth touch track is different from the first touch track and the second touch track;

obtain a third touch direction corresponding to the third touch operation and a fourth touch direction corresponding to the fourth touch operation; and generate the first control instruction if the third touch direction is the same as the first touch direction and the fourth touch direction is the same as the second touch direction.

Optionally, the processor is further adapted to:

determine a minimum angle formed between the first touch direction and the second touch direction;

determine whether the minimum angle is greater than or equal to a third preset threshold; and generate the first control instruction to zoom in or zoom out the display content on the display unit, if the minimum angle is greater than or equal to the third preset threshold.

DETAILED DESCRIPTION OF EMBODIMENTS

Embodiments of the disclosure provide a method for display control. The method includes: detecting a first touch operation and a second touch operation performed on a touch sensing unit. A first touch direction corresponding to the first touch operation and a second touch direction corresponding to the second touch operation are obtained. A first control instruction is obtained based on the first touch direction and the second touch direction. That is, in embodiments of the disclosure, the effect of a touch instruction response to two successively performed touch operations is different from the effect of a touch instruction response to two separately performed touch operations.

In the following, the technical solution of the present disclosure will be described in detail by way of embodiments and with reference to the drawings.

Figure 1:
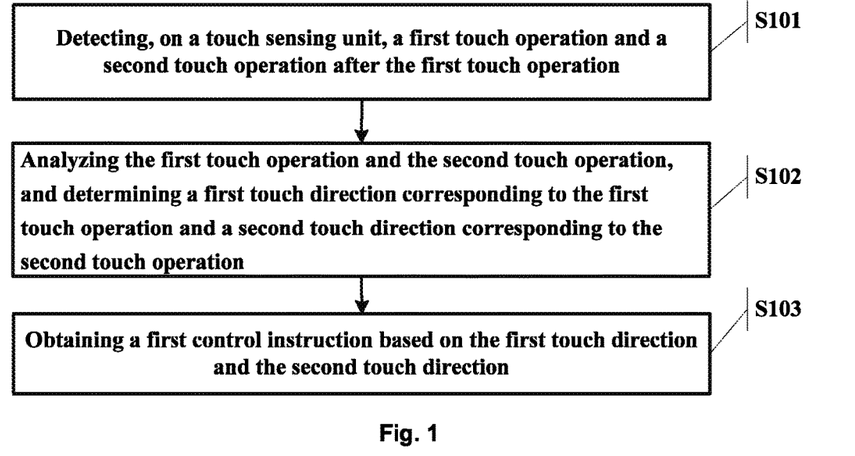
FIG. 1 is a schematic flow chart of a method for display control according to an embodiment of the disclosure.

FIG. 1 is a schematic flow chart of a method for display control according to an embodiment of the disclosure. The method comprises the following steps S101-S103.

At S101, a first touch operation and a second touch operation after the first touch operation are detected on a touch sensing unit.

It is noted here that, in the electronic device, the touch sensing unit and the display unit are arranged in an overlapped manner. When the touch sensing unit in the electronic device detects the first touch operation before it detects the second touch operation, the electronic device starts to respond to the first touch operation. It is noted here that starting to respond to the first touch operation means that the electronic device has not completed its responding to the first touch operation yet. For example, the electronic device responds to the first touch operation and obtains the second touch operation while responding to the first touch operation, or a corresponding touch instruction is generated from the first touch operation but the second touch operation is obtained before the touch instruction is responded to, or the electronic device responds to the first touch operation but the second touch operation is obtained even before the touch instruction corresponding to the first touch operation is generated.

As the user continues to operate on the touch sensing unit, the touch sensing unit will be able to detect the user's second touch operation after the first touch operation on the touch sensing unit. It is noted here that, the first touch operation and the second touch operation may be two parts of a single touch operation, as may be determined based on touch signs which could be a touch pause or touch directions. For example, the second touch operation is performed after a pause following the first touch operation, or the first touch operation and the second touch operation in different touch directions are successively performed with the user's finger kept on the touch sensing unit. Of course, the first touch operation and the second touch operation may also be two touch operations with an interval therebetween. For example, the second touch operation is performed after the user's finger performing the first touch operation has left the touch sensing unit. In the following embodiment, the first touch operation and the second touch operation are two separate touch operations.

After the first touch operation and the second touch operation are obtained, a first time interval between the first touch operation and the second is obtained. Then, it is determined whether the first time interval is less than or equal to a first preset threshold. If the first time interval is less than or equal to the first preset threshold, start to analyze the successively performed first and second touch operations. In short, it is determined whether the first touch operation and the second touch operation are successively performed, and if so, then start analyzing the first touch operation and the second touch operation. The user may himself define the first preset threshold, say 0.5 second or 1.0 second. It should be appreciated that there is not any other touch operation between the first touch operation and the second touch operation.

Additionally, the first time interval between the first touch operation and the second touch operation may be a time interval between a touch start time of the first touch operation and a touch start time of the second touch operation, or a time interval between a touch end time of the first touch operation and a touch end time of the second touch operation, or even a time interval between the touch start time of the first touch operation and the touch end time of the second touch operation.

Further, if the first time interval between the first touch operation and the second touch operation is greater than the first preset threshold, the electronic device will analyze the first touch operation to obtain a second control instruction and analyze the second touch operation to obtain a third control instruction, that is, the electronic device will respond separately to the first touch operation and the second touch operation; or the electronic device will continue to respond to the first touch operation. In this manner, it can be ensured that the user's touch operation can be timely responded to and that erroneous responses to the second touch operation, which is the user's misoperation, can be avoided. For example, after the first touch operation is completed, fingers that hold the cell phone may accidentally touch an edge of the touch sensing unit. At this point, the touch operations of the fingers are misoperations. By applying the above-described approach, erroneous responses to such misoperations can be avoided.

At S102, the first touch operation and the second touch operation are analyzed, and a first touch direction corresponding to the first touch operation and a second touch direction corresponding to the second touch operation are determined.

Initially, a first touch track on the touch sensing unit, which corresponds to the first touch operation, and a second touch track on the touch sensing unit, which corresponds to the second touch operation, are obtained.

Then, a first touch start point and a first touch end point in the first touch track and a second touch start point and a second touch end point in the second touch track are obtained.

The first touch direction of the first touch operation relative to a first edge of the touch sensing unit is determined based on the first touch start point and the first touch end point in the first touch track.

The second touch direction of the second touch operation relative to the first edge of the touch sensing unit is determined based on the second touch start point and the second touch end point in the second touch track.

It is noted here that the first touch operation and the second touch operation in embodiments of the disclosure are different from the double-click operation. In particular, a double-click operation consists of two click operations performed by the user at the same position on the touch sensing unit, so the double-click operation is limited. In contrast, embodiments of the disclosure only require that the directions of the first touch operation and the second touch operation be determined but do not limit their touch positions or lengths of their touch tracks. Accordingly, embodiments of the disclosure allow the user to perform the first touch operation and the second touch operation at any position on the touch sensing unit, thereby facilitating the user's operations.

Figure 2:
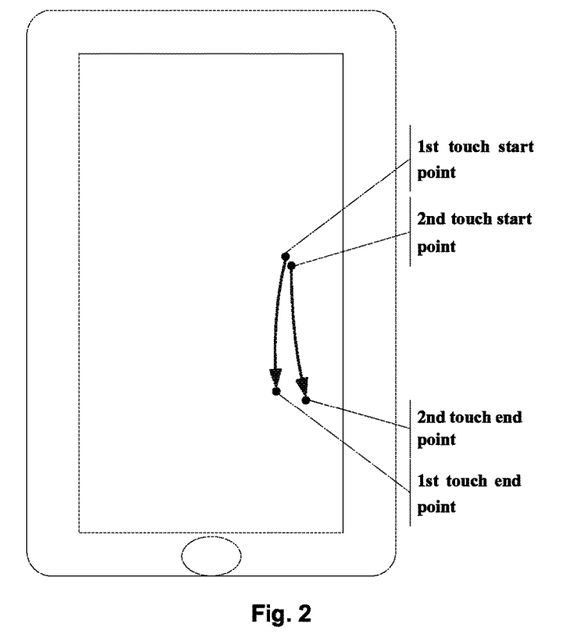
FIG. 2 is a first schematic diagram illustrating a touch manner according to an embodiment of the disclosure.

For example, in FIG. 2, the first touch operation corresponds to the first touch track, and the second touch operation corresponds to the second touch track. The first touch track contains the first touch start point and the first touch end point. According to these points, it can be determined that the first touch direction corresponding to the first touch operation is downward relative to the touch sensing unit. The second touch track contains the second touch start point and the second touch end point. According to these points, it can be determined that the second touch direction corresponding to the second touch operation is downward relative to the touch sensing unit. Although FIG. 2 only illustrates one approach for determining the touch direction according to an embodiment of the disclosure, any approach for determining the touch direction that can be obtained by those skilled in the art from the above-described technology falls within the scope encompassed by embodiments of the disclosure.

At S103, a first control instruction is obtained based on the first touch direction and the second touch direction.

The first touch direction and the second touch direction are determined in S102. Two angles may be formed between the first touch direction and the second touch direction. Then, a minimum angle between the first touch direction and the second touch direction is further determined.

The first control instruction corresponding to the minimum angle is obtained.

For example, in the electronic device according to an embodiment of the disclosure, a table is stored which defines a correspondence relationship between angles and control instructions as may be illustrated in detail in Table 1:

TABLE 1

| Angle | Control instuction |
|---|---|
| 0°-30° | The first control instruction |
| 31°-60° | The second control instruction |
| 60°-90° | The third control instruction |
| 91°-120° | The fourth control instruction |

From Table 1, we can see that a control instruction corresponding to a minimum angle between the first touch direction and the second touch direction may be determined as long as the minimum angle is determined. For example, if the minimum angle is 30°, then the first control instruction is obtained as a result.

Moreover, in addition to or instead of being defined according to Table 1, the correspondence relationship between angles and control instructions may be determined according to Table 2 as is illustrated in detail below:

TABLE 2

| Angle | Control instruction |
|---|---|
| 30° | The first control instruction |
| 60° | The second control instruction |
| 90° | The third control instruction |
| 120° | The fourth control instruction |

From Table 2, we can see that a corresponding control instruction may be determined as long as the minimum angle is determined. For example, if the minimum angle is 30°, then the first control instruction is obtained as a result.

Moreover, in addition to or instead of prestoring a correspondence relationship between angles and control instructions, it is possible to compare the obtained minimum angle with a second preset threshold, that is, to determine whether the minimum angle is less than or equal to the second preset threshold. If the minimum angle is less than or equal to the second preset threshold, then the first control instruction is obtained. For example, if the second preset threshold is 90° and the minimum angle is obtained as 30°, then the first control instruction is obtained.

Although the above implementations only illustrate several approaches for determining the control instruction based on the angle between touch directions, any approach for determining the control instruction based on the angle between touch directions that can be obtained by those skilled in the art from the solutions according to embodiments of the disclosure falls within the scope encompassed by embodiments of the disclosure.

Further, in embodiments of the disclosure, in addition to or instead of determining the control instruction based on the angle between touch directions, it is possible to further configure a correspondence relationship between touch directions and control instructions, that is, to determine and obtain the first control instruction corresponding to the first touch direction based on the correspondence relationship between touch directions and control instructions. In particular, if an area of a display content on the display unit is larger than an area of a display region on the display unit, upon completion of the second touch operation, the display content is moved at a preset moving speed until a boundary of the display content enters the display region, according to the first control instruction; or upon the completion of the second touch operation, the boundary of the display content is displayed at the display region (or optionally, the display content is moved at the preset moving speed after the boundary of the display content is displayed at the display region), according to the first control instruction.

For example, if the first touch direction and the second touch direction are both downward relative to the display unit of the electronic device, it is possible, by following the first control instruction, to scroll or flip down the content currently displayed on the display unit at a preset moving speed, or scroll down the content currently displayed on the display unit to its bottom, or scroll up the displayed content at the preset moving speed after it has been scrolled down to its bottom. If the first touch direction and the second touch direction are both upward relative to the display unit of the electronic device, it is possible, by following the first control instruction, to scroll or flip up the content currently displayed on the display unit at a preset moving speed, or scroll up the content currently displayed on the display unit to its top, or scroll down the displayed content at the preset moving speed after it has been scrolled up to its top.

Finally, based on the first touch direction or the second touch direction, the corresponding first control instruction may be determined. The establishment of the correspondence relationship between touch directions and control instructions makes it easy for the user to determine a control instruction corresponding to two successively performed touch operations.

Further, in embodiments of the disclosure, it is possible that a third touch operation and a fourth touch operation following the third touch operation are detected after the successively performed first and second touch operations and that a third time interval between the third touch operation and the fourth touch operation satisfies the first preset threshold.

At this point, a third touch track corresponding to the third touch operation and a fourth touch track corresponding to the fourth touch operation are obtained. The third touch track is different from the first touch track and the second touch track, and the fourth touch track is different from the first touch track and the second touch track.

Then, a third touch direction corresponding to the third touch track and a fourth touch direction corresponding to the fourth touch track are obtained. Approaches for determining the touch direction are already described in the above embodiments, and thus will not be repeated here for simplicity.

Figure 3:
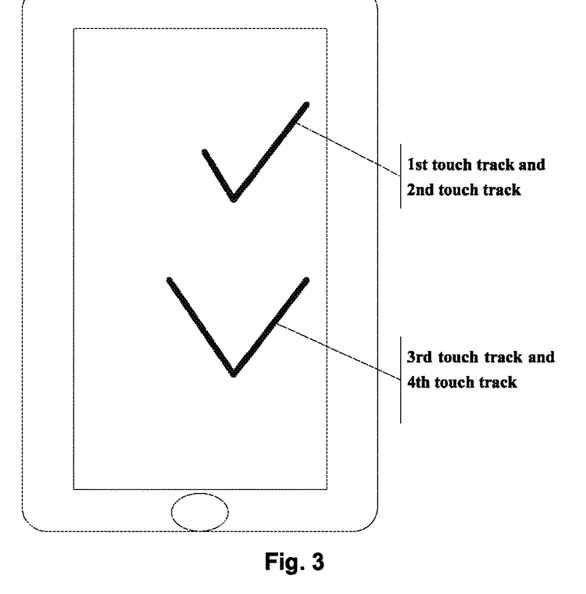
FIG. 3 is a second schematic diagram illustrating a touch manner according to an embodiment of the disclosure.

If the third touch direction is the same as the first touch direction and the fourth touch direction is the same as the first touch direction, then the control instruction corresponding to the successively performed third and fourth touch operations is still the first touch instruction. For example, as shown in FIG. 3, the first touch operation and the second touch operation that successively performed by the user on the touch sensing unit of the electronic device correspond to a track of a "V" shape, and the successive third and fourth touch operations correspond to a track of a "✓" shape. Then, the two groups of successive touch operations both correspond to the first control instruction. That is, the generation of the first control instruction is determined based on the touch directions corresponding to the touch operations, rather than the touch tracks corresponding to the touch operations.

Of course, in practical application, there may be an allowable range of deviation between the third touch direction and the first touch direction as well as between the fourth touch direction and the second touch direction.

Further, the above embodiments illustrate a case in which the minimum angle between the first touch direction and the second touch direction is less than or equal to the first preset threshold. However, in embodiments of the disclosure, the minimum angle between the first touch direction and the second touch direction may also be greater than a third preset threshold which may be the same as the first preset threshold in the above embodiments.

If the minimum angle between the first touch direction and the second touch direction is greater than the third preset threshold, then the first control instruction is generated for zooming in or zooming out the display content on the display unit. At this point, the first control instruction is functionally different from the first control instruction in the above embodiments.

Figure 4:
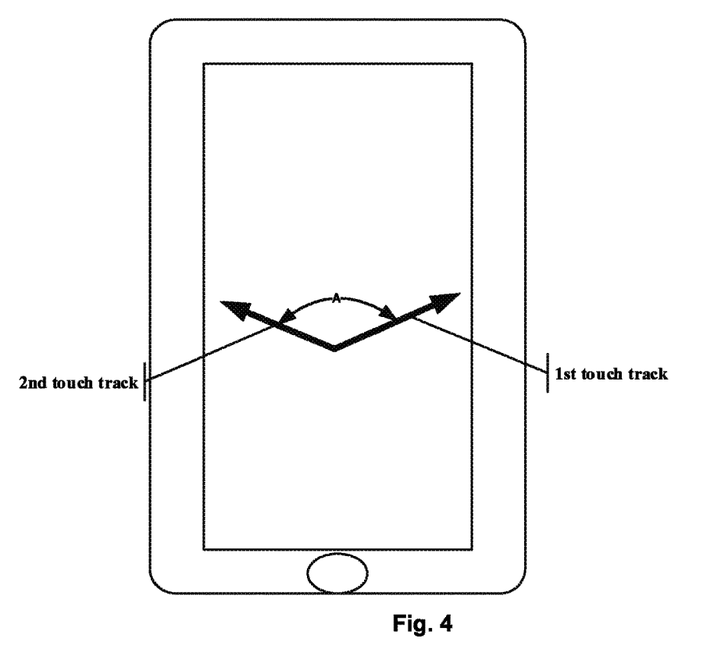
FIG. 4 is a third schematic diagram illustrating a touch manner according to an embodiment of the disclosure.
Figure 5:
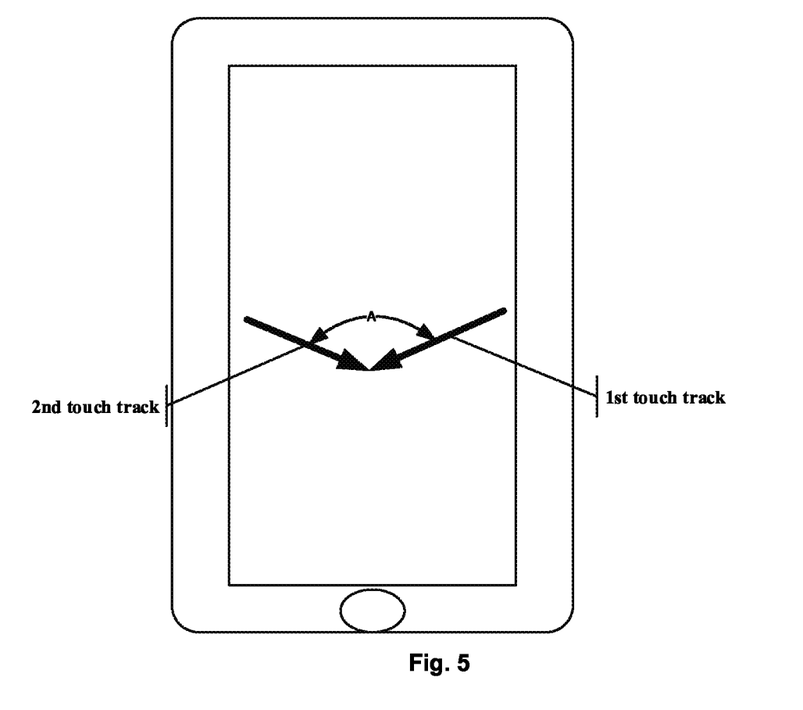
FIG. 5 is a fourth schematic diagram illustrating a touch manner according to an embodiment of the disclosure.

For example, the minimum angle between the first touch direction and the second touch direction in FIG. 4 is A and the third preset threshold is 90°. Because the minimum angle A in FIG. 4 is greater than 90°, the first touch direction and the second touch direction are opposite and respectively towards different edges of the display unit. Consequently, the first control instruction corresponding to the first touch direction and second touch direction is used to zoom in the content currently displayed on the display unit. Of course, if the first touch direction and the second touch direction are respectively towards the center of the display unit as shown in FIG. 5, then the obtained first touch instruction is used to zoom out the content currently displayed on the display unit.

Of course, the first control instruction generated at this point may also be used for closing the content currently displayed on the display unit. Without limiting the function corresponding to the first control instruction in embodiments of the disclosure, the user may define the function corresponding to the first control instruction according to various scenarios in practical application.

Further, in embodiments of the disclosure, with an electronic device held in one hand, a user can achieve the effect of multi-touch by performing the first touch operation and the second touch operation according to embodiments of the disclosure. For example, the user may zoom in or zoom out the display content by successively performing two touch operations as shown in FIGS. 4 and 5. In the prior art, the same effect is instead achieved by simultaneous touchings and slidings with two fingers. As such, it is possible to replace a multi-touch with successive touch operations. Also, the user's control of the display content is facilitated and user experience is improved.

Further, in embodiments of the disclosure, the time interval between the touch start time and the touch end time corresponding to each of the first touch operation, the second touch operation, the third touch operation and the fourth touch operation is less than or equal to a fourth preset threshold. That is, the touch operations in embodiments of the disclosure have short durations. For example, the entire duration of a touch operation is less than or equal to 1 second or 0.5 seconds. As such, it is possible to effectively prevent the electronic device from responding solely to the first touch operation or solely to the second touch.

Figure 6:
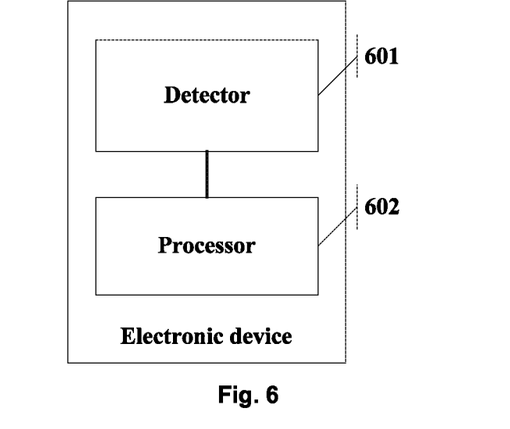
FIG. 6 is a schematic structural diagram of an electronic device according to an embodiment of the disclosure.

Correspondingly to the method for display control according to embodiments of the disclosure, an electronic device is further provided in embodiments of the disclosure. FIG. 6 is a structural diagram of an electronic device according to an embodiment of the disclosure. The electronic device comprises the following components 601 and 602.

A detector 601 is adapted to detect, on a touch sensing unit, a first touch operation and a second touch operation after the first touch operation.

A processor 602, coupled to the detector, is adapted to:
analyze the first touch operation and the second touch operation;
determine a first touch direction corresponding to the first touch operation and a second touch direction corresponding to the second touch operation;
obtain a first control instruction based on the first touch direction and the second touch direction, wherein the first control instruction is different from instruction consisting of a second control instruction corresponding to the first touch operation and a third control instruction corresponding to the second touch operation.

Further, the processor 602 is further adapted to respond to the first touch operation.

Further, the processor 602 is specifically adapted to:
obtain a first time interval between the first touch operation and the second touch operation;
analyze the first touch operation and the second touch operation if the first time interval is less than or equal to a first preset threshold;
analyze the first touch operation to obtain the second control instruction and analyze the second touch operation to obtain the third control instruction if the first time interval is greater than the first preset threshold.

Further, the processor 602 is further adapted to:
determine a first touch track based on the first touch operation and a second touch track based on the second touch operation;
obtain a first touch start point and a first touch end point in the first touch track and a second touch start point and a second touch end point in the second touch track;
determine the first touch direction of the first touch operation relative to a first edge of the touch sensing unit based on the first touch start point and the first touch end point in the first touch track; and
determine the second touch direction of the second touch operation relative to the first edge of the touch sensing unit based on the second touch start point and the second touch end point in the second touch track.

Further, the processor 602 is further adapted to:
determine a minimum angle formed between the first touch direction and the second touch direction;
obtain the first control instruction corresponding to the minimum angle to control a display content on a display unit.

Further, the processor 602 is further adapted to:

determine a minimum angle formed between the first touch direction and the second touch direction;

determine whether the minimum angle is less than or equal to a second preset threshold; and obtain the first control instruction to control a display content on a display unit if the minimum angle is less than or equal to the second preset threshold.

Further, if an area of the display content is larger than an area of a display region on the display unit, the processor 602 is further adapted to control the display content in response to the first control instruction by:

moving the display content at a preset speed upon completion of the second touch operation, until a boundary of the display content enters the display region; or displaying the boundary of the display content at the display region upon completion of the second touch operation.

Further, the processor 602 is further adapted to:

detect a third touch operation and a fourth touch operation after the third touch operation;

determine a third touch track corresponding to the third touch operation and a fourth touch track corresponding to the fourth touch operation, wherein the third touch track is different from the first touch track and the second touch track, and the fourth touch track is different from the first touch track and the second touch track;

obtain a third touch direction corresponding to the third touch operation and a fourth touch direction corresponding to the fourth touch operation; and generate the first control instruction if the third touch direction is the same as the first touch direction and the fourth touch direction is the same as the second touch direction.

Further, the processor 602 is further adapted to:

determine a minimum angle formed between the first touch direction and the second touch direction;

determine whether the minimum angle is greater than or equal to a third preset threshold; and generate the first control instruction to zoom in or zoom out the display content on the display unit, if the minimum angle is greater than or equal to the third preset threshold.

While preferred embodiments of the application have been described above, those skilled in the art would be able to make additional changes and modifications to the embodiments once they learnt the basic inventive concept of the application. Therefore, the appended claims are intended to be interpreted as encompassing the preferred embodiments and all the changes and modifications that fall within the scope of the application.

Obviously, those skilled in the art may make modifications and variations to the application without departing from the spirit and scope of the application. Therefore, if such modifications and variations fall with the scope of the claims and their equivalent technologies, then the application is intended to encompass such modifications and variations.

What is claimed is:

1. A method for display control in an electronic device, comprising:

detecting, on a touch sensing unit, a first touch operation and a second touch operation after the first touch operation, wherein there is no other touch operation between the first touch operation and the second touch operation and a touch end point of the first touch operation is different from a touch start point of the second touch operation;

obtaining a first time interval between the first touch operation and the second touch operation, wherein the first time interval is a duration from a touch start time of the first touch operation to a touch start time of the second touch operation;

analyzing the first touch operation and the second touch operation if the first time interval is less than or equal to a first preset threshold;

determining a first touch direction corresponding to the first touch operation and a second touch direction corresponding to the second touch operation;

obtaining a first control instruction based on the first touch direction and the second touch direction, wherein the first control instruction is different from a second control instruction and a third control instruction, the second control instruction and the third control instruction respectively corresponding to the first touch operation and the second touch operation; and controlling display content to be displayed on a display unit based on the first control instruction.

2. The method according to claim 1, wherein prior to detecting the second touch operation, the method further comprises:

detecting the first touch operation on the touch sensing unit; and responding to the first touch operation.

3. The method according to claim 1, further comprising:

analyzing the first touch operation to obtain the second control instruction and analyzing the second touch operation to obtain the third control instruction if the first time interval is greater than the first preset threshold, wherein the second control instruction and the third control instruction are performed separately.

4. The method according to claim 1, wherein said determining the first touch direction and the second touch direction comprises:

determining a first touch track based on the first touch operation, and determining a second touch track based on the second touch operation;

obtaining a first touch start point and a first touch end point in the first touch track and a second touch start point and a second touch end point in the second touch track;

determining the first touch direction of the first touch operation relative to a first edge of the touch sensing unit based on the first touch start point and the first touch end point in the first touch track; and determining the second touch direction of the second touch operation relative to the first edge of the touch sensing unit based on the second touch start point and the second touch end point in the second touch track.

5. The method according to claim 1, wherein said obtaining the first control instruction based on the first touch direction and the second touch direction comprises:

determining a minimum angle formed between the first touch direction and the second touch direction; and obtaining the first control instruction corresponding to the minimum angle to control display content to be displayed on the display unit.

6. The method according to claim 1, wherein said obtaining the first control instruction based on the first touch direction and the second touch direction comprises:

determining a minimum angle formed between the first touch direction and the second touch direction;

determining whether the minimum angle is less than or equal to a second preset threshold; and obtaining the first control instruction to control display content to be displayed on the display unit, if the minimum angle is less than or equal to the second preset threshold.

7. The method according to claim 5, wherein if the display content to be displayed has an area larger than that of the display unit, the method further comprises:
moving the display content at a preset speed upon completion of the second touch operation, until a boundary of the display content is displayed on the display unit; or
displaying the boundary of the display content on the display unit upon completion of the second touch operation.

8. The method according to claim 1, further comprising:
detecting a third touch operation and a fourth touch operation after the third touch operation;
determining a third touch track corresponding to the third touch operation and a fourth touch track corresponding to the fourth touch operation, wherein the third touch track is different from the first touch track and the second touch track, and the fourth touch track is different from the first touch track and the second touch track;
obtaining a third touch direction corresponding to the third touch operation and a fourth touch direction corresponding to the fourth touch operation; and
generating the first control instruction if the third touch direction is the same as the first touch direction and the fourth touch direction is the same as the second touch direction.

9. The method according to claim 1, wherein said obtaining the first control instruction based on the first touch direction and the second touch direction comprises:
determining a minimum angle formed between the first touch direction and the second touch direction;
determining whether the minimum angle is greater than or equal to a third preset threshold; and
generating the first control instruction to zoom in or zoom out display content to be displayed on the display unit, if the minimum angle is greater than or equal to the third preset threshold.

10. The method according to claim 1, wherein a time interval between a touch start time and a touch end time corresponding to each of the first touch operation and the second touch operation is less than or equal to a fourth preset threshold.

11. An electronic device, comprising:
a detector adapted to detect, on a touch sensing unit, a first touch operation and a second touch operation after the first touch operation, wherein there is no other touch operation between the first touch operation and the second touch operation and a touch end point of the first touch operation is different from a touch start point of the second touch operation; and
a processor coupled to the detector, and adapted to:
obtain a first time interval between the first touch operation and the second touch operation, wherein the first time interval is a duration from a touch end time of the first touch operation to a touch end time of the second touch operation;
analyze the first touch operation and the second touch operation if the first time interval is less than or equal to a first preset threshold;
determine a first touch direction corresponding to the first touch operation and a second touch direction corresponding to the second touch operation;
obtain a first control instruction based on the first touch direction and the second touch direction, wherein the first control instruction is different from a second control instruction corresponding to the first touch operation and a third control instruction corresponding to the second touch operation; and
control display content to be displayed on a display unit based on the first control instruction.

12. The electronic device according to claim 11, wherein the processor is further adapted to respond to the first touch operation.

13. The electronic device according to claim 11, wherein the processor is further adapted to:
analyze the first touch operation to obtain the second control instruction and analyze the second touch operation to obtain the third control instruction if the first time interval is greater than the first preset threshold, wherein the second control instruction and the third control instruction are performed separately.

14. The electronic device according to claim 11, wherein the processor is further adapted to:
determine a first touch track based on the first touch operation and a second touch track based on the second touch operation;
obtain a first touch start point and a first touch end point in the first touch track and a second touch start point and a second touch end point in the second touch track;
determine the first touch direction of the first touch operation relative to a first edge of the touch sensing unit based on the first touch start point and the first touch end point in the first touch track; and
determine the second touch direction of the second touch operation relative to the first edge of the touch sensing unit based on the second touch start point and the second touch end point in the second touch track.

15. The electronic device according to claim 11, wherein the processor is further adapted to:
determine a minimum angle formed between the first touch direction and the second touch direction; and
obtain the first control instruction corresponding to the minimum angle to control display content to be displayed on the display unit.

16. The electronic device according to claim 11, wherein the processor is further adapted to:
determine a minimum angle formed between the first touch direction and the second touch direction;
determine whether the minimum angle is less than or equal to a second preset threshold; and
obtain the first control instruction to control display content to be displayed on the display unit, if the minimum angle is less than or equal to the second preset threshold.

17. The electronic device according to claim 15, wherein if the display content to be displayed has an area larger than that of the display unit, the processor is further adapted to control the display content in response to the first control instruction by:
moving the display content at a preset speed upon completion of the second touch operation, until a boundary of the display content is displayed on the display unit; or
displaying the boundary of the display content on the display unit upon completion of the second touch operation.

18. The electronic device according to claim 11, wherein the processor is further adapted to:

detect a third touch operation and a fourth touch operation after the third touch operation;

determine a third touch track corresponding to the third touch operation and a fourth touch track corresponding to the fourth touch operation, wherein the third touch track is different from the first touch track and the second touch track, and the fourth touch track is different from the first touch track and the second touch track;

obtain a third touch direction corresponding to the third touch operation and a fourth touch direction corresponding to the fourth touch operation; and generate the first control instruction if the third touch direction is the same as the first touch direction and the fourth touch direction is the same as the second touch direction.

19. The electronic device according to claim 11, wherein the processor is further adapted to:

determine a minimum angle formed between the first touch direction and the second touch direction;

determine whether the minimum angle is greater than or equal to a third preset threshold; and generate the first control instruction to zoom in or zoom out the display content on the display unit, if the minimum angle is greater than or equal to the third preset threshold.

* * * * *